United States Patent [19]
Oetiker

[11] Patent Number: 5,768,752
[45] Date of Patent: Jun. 23, 1998

[54] PUZZLE-LOCK COMPRESSION RING

[75] Inventor: Hans Oetiker, Horgen, Switzerland

[73] Assignee: Hans Oetiker AG Maschinen-Und Apparatefabrik, Horgen, Switzerland

[21] Appl. No.: 804,080

[22] Filed: Feb. 21, 1997

Related U.S. Application Data

[60] Provisional application No. 60/015,700, Apr. 17, 1996.

[51] Int. Cl.⁶ .............................. F16B 2/08; B65D 63/02
[52] U.S. Cl. ................... 24/20 R; 24/20 EE; 24/20 CW
[58] Field of Search ........................... 24/20 EE, 20 CW, 24/279, 20 TT, 20 LS, 23 EE, 20 W, 20 S, 20 R, 16 R; 29/521

[56] References Cited

U.S. PATENT DOCUMENTS

| | | | |
|---|---|---|---|
| 983,093 | 1/1911 | Svenson | 24/20 EE |
| 1,349,789 | 8/1920 | Schirra | 24/20 CW X |
| 4,451,955 | 6/1984 | Kern et al. | 24/20 CW |
| 4,544,010 | 10/1985 | Friedewald | 24/20 EE X |
| 5,001,816 | 3/1991 | Oetiker | 24/20 CW X |
| 5,150,503 | 9/1992 | Müller | 24/20 EE |
| 5,185,908 | 2/1993 | Oetiker | 24/20 CW X |
| 5,191,683 | 3/1993 | Ojimma et al. | 24/20 CW X |

*Primary Examiner*—Peter M. Cuomo
*Assistant Examiner*—Robert J. Sandy
*Attorney, Agent, or Firm*—Birch, Stewart, Kolasch & Birch, LLP

[57] ABSTRACT

A compression ring with a mechanical connection in which the tongue-like member in the male part is provided with an enlarged head portion defined by transversely extending abutment surfaces forming a right angle with the lateral abutment surfaces of the enlarged head portion whereby the lateral abutment surfaces of the enlarged head portion pass over into the transverse end abutment surface of the head portion by way of a curved portion. The joints of some of the transversely extending abutment surfaces are subjected to swaging action to displace material in such a manner that the tendency of the male and female parts of the mechanical connection to move relative to one another in the radial direction is significantly reduced.

25 Claims, 2 Drawing Sheets

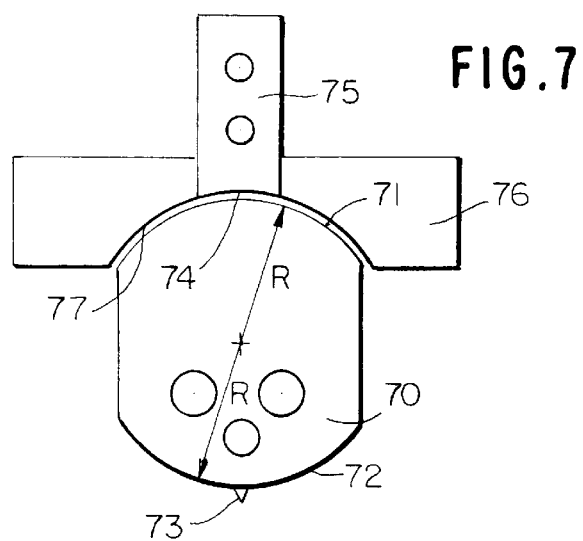
FIG. 7
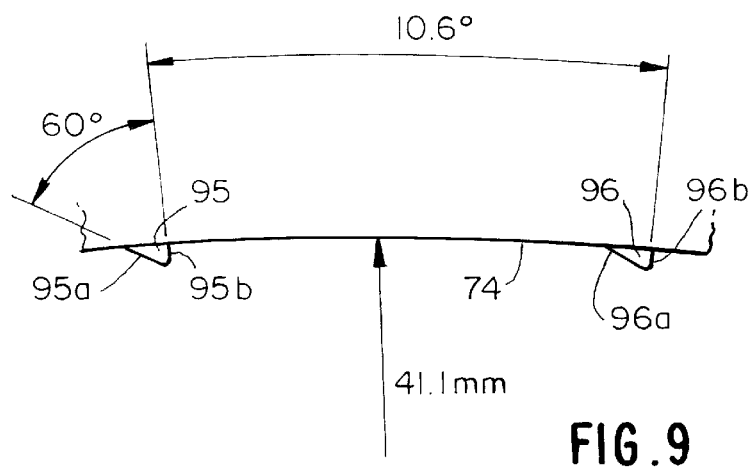
FIG. 8
FIG. 9

PUZZLE-LOCK COMPRESSION RING

FIELD OF THE INVENTION

The present invention relates to a compression ring with a so-called puzzle-lock mechanical connection which is adapted to be shrunk over the object to be fastened thereby.

BACKGROUND OF THE INVENTION

Compression rings with so-called puzzle-lock connections are disclosed in my prior U.S. Pat. Nos. 5,001,816 and 5,185,908. These prior art puzzle-lock compression rings proved quite successful. However, they occasionally reopened during transport thereof to the customer. Moreover, there is always a desire to improve the performance of such compression rings as regards holding ability.

SUMMARY OF THE INVENTION

Accordingly, it is an object of this invention to provide a puzzle-lock compression ring which obviates the aforementioned shortcomings and drawbacks in a simple and cost-effective manner.

Another object of the present invention resides in a compression ring of the type mentioned above whose puzzle-lock connection has been improved as regards holding ability.

A further object of this invention resides in a puzzle-lock compression ring in which reopening during shipment is effectively prevented. Though my aforementioned patents suggested spot-welding, laser-beam welding and material displacement by the use of a punch prick, these prior art patents contained no details, particularly as regards any swaging operation.

According to one embodiment of the present invention, the puzzle-lock connection has been improved by providing additional material in critical areas previously subjected to tearing or lifting up as a result of stresses caused by circumferential forces in the ring without any substantial reduction in the length of the force-absorbing abutment surfaces in the puzzle-lock connection which extend transversely to the circumferential direction of the compression ring. This is achieved in that the enlarged head portion of the tongue member is provided with a rounded-off configuration between the lateral surfaces of the enlarged head portion and the transversely extending end surface while maintaining a substantially rectangular relationships between the transversely extending abutment surfaces at the beginning of the enlarged head portion and the corresponding adjoining longitudinally extending abutment surfaces formed in the male part and by the recess in the female part of the puzzle lock connection.

Additionally according to a preferred embodiment of the present invention the inner and outer compression ring surfaces of certain areas of the puzzle lock are subjected to a swaging action displacing material in such a manner that the likelihood of reopening of the puzzle lock is reduced, and its holding ability with respect to radially directed forces is increased.

DETAILED DESCRIPTION OF THE DRAWINGS

These and other objects, features and advantages of the present invention will become more apparent from the following description when taken in conjunction with the accompanying drawing, which shows, for purposes of illustration only, one embodiment in accordance with the present invention, and wherein:

FIG. 7 is a schematic elevational view showing an apparatus for carrying out the swaging operation;

FIG. 8 is an enlarged cross-sectional view, similar to

Figure 4:
FIG. 4 is a cross-sectional view taken along line 4—4 of FIG. 3.

FIG. 4, and illustrating details of the areas of the compression ring subjected to a swaging operation; and FIG. 9 is an enlarged cross-sectional view illustrating details of the swaging teeth.

DETAILED DESCRIPTION OF THE DRAWINGS

Figure 1:
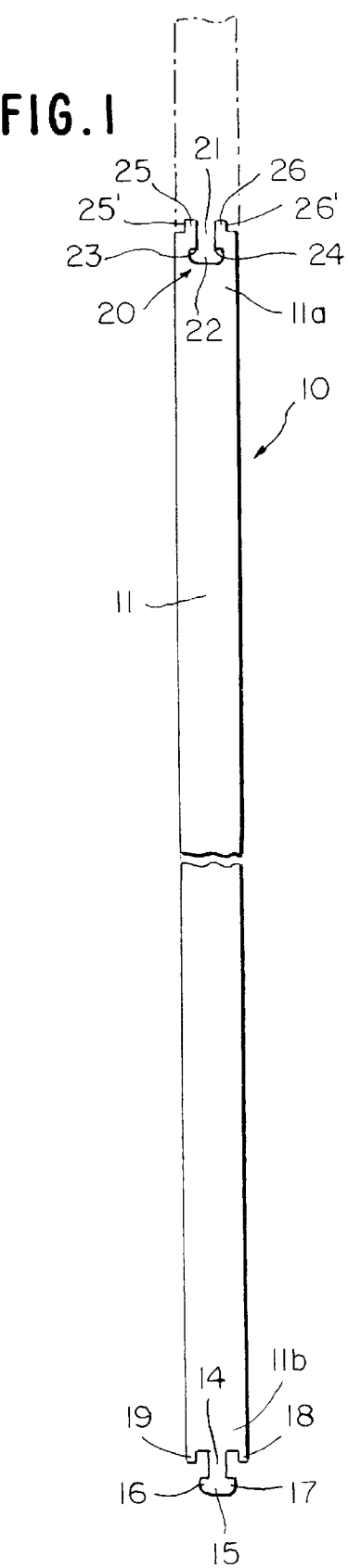
FIG. 1 is a plan view of a blank of a puzzle-lock compression ring of this invention in flat condition.
Figure 2:
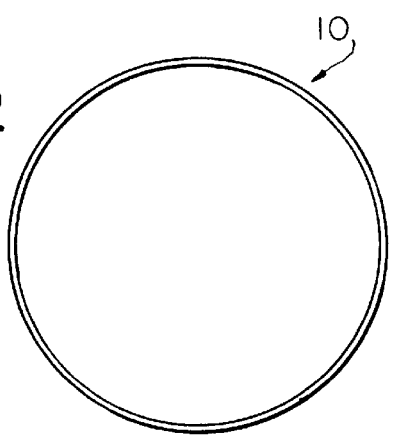
FIG. 2 is an axial elevational view of the compression ring formed by means of the blank of FIG. 1.
Figure 3:
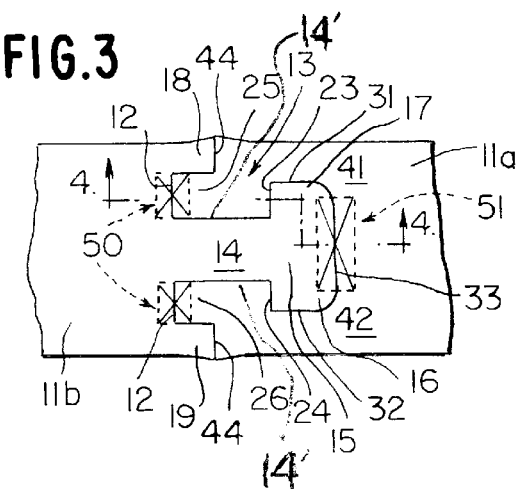
FIG. 3 is an enlarged view of the puzzle lock connection of a preferred embodiment of this invention.

Referring now to the drawing, wherein like reference numerals are used throughout the various views to designate like parts, reference numeral 10 generally designates the blank 11 for the compression ring (FIG. 1), respectively, the compression ring (FIG. 2) formed with the blank 11 of FIG. 1. As explained in the aforementioned patents, transversely extending mutually engaging force-absorbing abutment surfaces along certain edges in the mechanical connection generally designated by reference numeral 13 and resembling a puzzle-type connection serve the purpose of absorbing compression and tensional forces in the compression ring. The male and female configurations of the mechanical connection 13 including these abutment surfaces also serve for the purpose of connecting the two end portions 11a and 11b of the blank 11 with each other. The male end portion 11b of the puzzle-lock connection 13 includes a retaining tongue-like portion 14 which is provided with an enlarged head portion 15 (FIGS. 1 and 3). The retaining tongue-like portion 14 includes a substantially longitudinally extending abutment surface 14' extending along the length thereof. The enlarged head portion 15 includes laterally extending lug portions 16 and 17 (FIG. 3) delimited by rectilinear lateral abutment surfaces 31 and 32 and engaging in a complementarily shaped enlarged recess portion 22 adjoining the channel-like recess portion 21 for the tongue-like portion 14 in the female part generally designated by reference numeral 20 provided in the end portion 11a of the blank 11 (FIG. 1). The tongue-like member 14 and its enlarged head portion 15 thereby engages in the channel-like recess portion 21 and in the enlarged recess portion 22, respectively, of the female part 20 which extends in the longitudinal direction of the blank 11 (FIG. 1) so that the tongue-like portion 14 engages with its enlarged head portion 15 from behind at the abutment surfaces 23 and 24.

If the mechanical connection 13 of the compression ring according to this invention is stressed in tension or compression, there exists the tendency of the areas of the end portion 11a located behind the abutment surfaces 23 and 24 to move laterally away from the tongue-like portion 14, as a result of which the tongue-like portion 14 together with its enlarged head portion 15 might be pulled or pushed out of the recess 20 because the channel-like recess portion 21 would then open up. To counteract this tendency, two lateral lug portions 18 and 19 are provided in the lateral areas of the male part of the mechanical connection in the end portion 11b which abut along the longitudinally extending edge surfaces 25' and 26' of the longitudinally extending portions 25 and 26 in the female part of the mechanical connection 13 to counteract any lateral bending out of the two portions 25 and 26. Owing to this particular arrangement of the two lug portions 18 and 19, the mechanical connection of the end portions 11a and 11b is effectively secured against tensional or compression forces.

Figure 5:
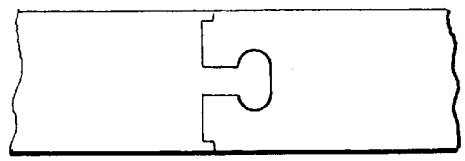
FIG. 5 is a partial plan view on a puzzle-lock compression ring of the prior art shown in FIG. 1 of my prior U.S. patents.
Figure 6:
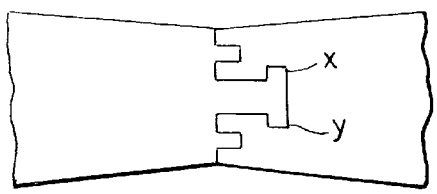
FIG. 6 is a partial plan view of a prior art puzzle-lock connection as shown in FIG. 2 of my aforementioned patents.

In the prior art embodiment illustrated in FIG. 5 of this application, the enlarged head portion includes rounded-off lateral lug portions of semi-circular configurations while in the prior art embodiment illustrated in FIG. 6 herein, the enlarged head portion is of rectangular configuration with right angles in the four corners thereof.

It has now been discovered surprisingly that the holding ability of the mechanical connection can be significantly improved if the right angle relationship x and y shown in FIG. 6 is replaced in only these two corners of the enlarged head portion by a rounded-off configuration. The right angle relationship between transversely extending abutment surfaces 23, 24 and the lateral abutment surfaces 31, 32 is maintained in order to realize as large as possible transversely extending abutment surfaces 23 and 24. On the other hand, the prior right angle relationship between the lateral abutment surfaces 31 and 32 and the transversely extending end surface 33 of the enlarged head portion 15 is now changed to a rounded-off configuration involving a quarter-circle with a small radius. As a result of this arrangement, the additional material present in the areas 41 and 42 of the female part in the end portion 11a reduces the risk of tearing and/or lifting up of the lateral parts of the end portion 11a. Tests have indicated that a significant improvement is obtainable with this new configuration. The right angle relationship between other adjoining abutment surfaces is maintained to the extent practicable to maintain transversely extending abutment surfaces, especially at the abutment surfaces 12 in the swaging areas 50, which are as long as possible.

According to another feature of one embodiment of this invention, the joints formed along mutually engaging abutment surfaces 12 and 33 are subjected to a swaging action in the areas indicated in FIG. 3 in dash lines and designated by reference numerals 50 and 51 with the use of more or less conventional means to displace material as shown in FIGS. 4 and 8 in order to lessen the likelihood of relative movement in the radial direction of the compression ring between the two end portions 11a and 11b.

The following Table I indicates the significant improvement in the holding ability of compression rings with swaged puzzle-lock connection versus the same compression rings with non-swaged mechanical connection. In all tests the compression rings were made from "Galfan" band steel material having a nominal diametric dimension of 95.9 mm. after shrinking, a band width of 10 mm. and a band thickness of 1.2 mm. As all tests were carried out with compression rings in an as-manufactured condition, i.e., before shrinking to demonstrate the greater holding ability during shipping, all test samples had a diametric dimension of 99 mm. The swaged test samples had three swaging areas as indicated in dash lines in FIG. 3 and generally designated by reference numerals 50 and 51, whereby swaging was carried out internally and externally of the band in a symmetrical manner as shown in FIGS. 4 and 8. The test equipment involved conventional principles of operation with approximately π-shaped, tapering segments forming an internal small circular configuration and an external larger circular configuration. The compression ring test samples were thereby placed about the outer circumference of the segments and a tapering circular mandrel-like member was slowly driven through the internal circular opening of the segments in such a manner that the diametric dimension of the tapering mandrel-like member gradually increased, thereby exerting ever-larger uniform radially directed forces on the segments. By measuring the downward force applied to the tapering mandrel-like member, for example, by a force-measuring cell located at the bottom of the mandrel-like member, the radial forces at which a test sample failed could be readily determined by multiplying the downward force by a constant factor of 28.05. The test results involving 20 test samples which were identical except that 10 samples involved non-swaged mechanical connections and 10 samples involved swaged mechanical connections are reproduced in Table I which shows that the holding ability of the same type of compression rings can be improved on the average by more than 100% in the as-manufactured condition, i.e., before being installed by shrinking. The radial forces at which failure occurred, i.e., at which the mechanical connection opened up, are expressed in Newton.

TABLE I

RADIAL PRESSURE FAILURE TESTS

|  | Non-Swaged Newton | Swaged Newton |
|---|---|---|
| No. 1 | 347 | 614 |
| No. 2 | 234 | 599 |
| No. 3 | 246 | 672 |
| No. 4 | 345 | 613 |
| No. 5 | 274 | 654 |
| No. 6 | 300 | 640 |
| No. 7 | 283 | 621 |
| No. 8 | 269 | 724 |
| No. 9 | 275 | 609 |
| No. 10 | 315 | 628 |
| Average | 288.8 | 637.4 |

The dimensions of a typical sample of a compression ring with a nominal diameter of 95.9 mm., a band width of 10 mm. and a band thickness of 1.2 mm. and made from "Galfan" band steel material are as follows, it being understood that these dimensions are merely for purposes of illustration of one embodiment and are not to be construed as limitative of this invention because these dimensions may be varied as known to those skilled in the art.

In this typical non-limitative example of one embodiment in accordance with the present invention, the length of the clamping band having a 10 mm. width is determined by the diametric dimension required for the nominal diameter of the shrunk compression ring. The length of the tongue member taken from a transverse line coinciding with abutment surfaces 12 to the transverse outermost abutment surface 33 of the enlarged head 15 is 7.5 mm., the width of the enlarged head surface from lateral abutment surface 31 to lateral abutment surface 32 is 6 mm., the length of the lateral lug portions 18 and 19 from a transverse line coinciding with abutment surfaces 12 to a line coinciding with abutment surfaces 44 is 2 mm., the length from a line coinciding with abutment surfaces 44 to a transverse line coinciding with surfaces 23, 24 is 2.5 mm., and the radius of curvature in the head portion is 1 mm. The width of the centrally located tongue-like portion 14 is 3 mm., the width of the lug portions 18 and 19 is 1.5 mm., the width of the swaged areas 50 is 2 mm., the width of the swaged area 51 is 4 mm. and the thickness of the clamping band is 1.2 mm. All dimensions indicated are with the blank 11 in flat condition.

As shown in FIGS. 4 and 8, the material displacement is carried out both on the outside 11' and the inside 11" of the compression ring in a symmetrical manner in the two areas 50 and in the area 51 of FIG. 3. As shown in FIG. 8, each internal indentation 90 on the inner surface 11" of the compression ring 10 and each external indentation 91 in the external surface 11' of the compression ring 10 which are produced by swaging has a depth of about 0.35 mm. and is defined by the side surfaces 90a, 90b and 91a, 91b, whereby respective side surfaces 90a, 90b and 91a, 91b subtend an angle of about 60°, and whereby their mutual intersections as also their intersections with the inner and outer surfaces 11" and 11' of the ring 11 are rounded off with a radius of about 0.1 mm. The distance of the smaller side surface 90b to the plane 92 of the cut represented, for example, by abutting surfaces 12 or 33 is about 0.6 mm.

FIG. 7 illustrates schematically a device for carrying out the swaging operation which includes a core-like matrix member 70 with an external upper surface 71 and an external lower surface 72 each forming part of a circle with a radial dimension R of the inner surface of the completed compression ring. A stamping die 75, which is actuated in any conventional known manner with the required force, is reciprocably guided in a relatively fixed machine part 76 to move to and fro during the swaging operation. The core-like matrix 70 is thereby fastened to the relatively fixed machine part 76 in any conventional manner (not shown) and is provided in its surface 72 with a small projection 73 to engage, for example, in a recess or small opening in the compression ring to properly position the same for the swaging operation. The matrix 70 as well as the stamping die 75 are thereby provided with small swaging teeth (FIG. 9) to perform the swaging operation. In one embodiment of this invention using clamping rings of the type used with the tests of Table I, the width of the swaging action along the abutment surface 33 may be about 4 mm. and in the areas of the abutment surfaces 12 may be about 2 mm. The spacing between the external surface 71 on the matrix member 70 and the internal surfaces 74 and 77 of the stamping die 75 in its extended position and of the machine part 76 corresponds substantially to the thickness of the clamping band.

FIG. 9 illustrates the shape of the swaging teeth which are provided on the surface 74 of the stamping die 75 and on the surface 71 of matrix member 70 of the machine of FIG. 7, whereby the teeth are so located as to produce material displacement in the inner and outer surfaces 11" and 11' of the band material forming the compression ring within the swaging areas 50 and 51 as shown in FIG. 8. As these swaging teeth have substantially the same shape in the surfaces 74 and 71, only the swaging teeth 95 and 96 in surface 74 are shown in FIG. 9. Each of these swaging teeth 95 and 96 are defined by side surfaces 95a, 95b and 96a, 96b, whereby respective side surfaces 95a, 95b and 96a, 96b subtend an angle of about 60°, and whereby their mutual intersections as also their intersections with surface 74 are rounded off with a radius of about 0.1 mm. The maximum outward projection distance of teeth 95 and 96 from surface 74 at the intersection of the side surfaces 95a, 95b and 96a, 96b is about 0.35 mm. The spacing of these teeth in the circumferential direction and in the width direction are to conform to the dimension of the swaging areas 50 and 51 of FIGS. 3 and 8, whereby two such teeth 95 are provided spaced in the axial direction of the swaging die member 75 for the two swaging areas 50.

The following tabulations (FIGS. 2A–9A) and graphs (FIGS. 2B–9B) indicate the improvement in holding ability of various sizes of compression rings as shown in FIGS. 3 and 4 and made from different materials but all provided with swaged puzzle-lock connections as described above. In all of these tests, the compression rings were shrunk by 4 mm. in diameter prior to the measurements. Measurements were again made on a machine in which the shrunk compression rings are placed along the circular outer surfaces of a number of π-shaped tapering segments, forming internally a smaller diameter circular opening, whereby a tapering mandrel is forced down through this smaller opening with predetermined downwardly directed force which is measured by a load cell from which are derived the radial forces. In the diagrams of FIGS. 2B–9B, the radial forces are thereby given in daN (Newton×10).

Radial Force Diagram Shrunk-Ring Size 49.6 - Band 9 × 1.5
Material Peraluman 300-02 Al—Mg3

| Diameter Increase | Axial Load in Kg | | | | Average Value Radial Force In |
|---|---|---|---|---|---|
| In mm | Ring 1 | Ring 2 | Ring 3 | Ring 4 | daN |
| 0 | 1.00 | 1.00 | 1.00 | 1.00 | 28.05 |
| 0.1 | 11.85 | 12.00 | 6.00 | 13.00 | 300.49 |
| 0.2 | 20.25 | 23.00 | 12.00 | 25.00 | 562.75 |
| 0.3 | 26.60 | 30.00 | 22.00 | 31.00 | 768.57 |
| 0.4 | 29.46 | 29.00 | 30.00 | 33.00 | 851.74 |
| 0.5 | 31.00 | 32.00 | 33.00 | 34.00 | 911.63 |
| 0.6 | 32.00 | 32.00 | 34.00 | 33.00 | 918.64 |
| 0.7 | 30.00 | 24.00 | 32.00 | 32.00 | 827.48 |
| 0.8 | 0.00 | 0.00 | 0.00 | 0.00 | 0.00 |

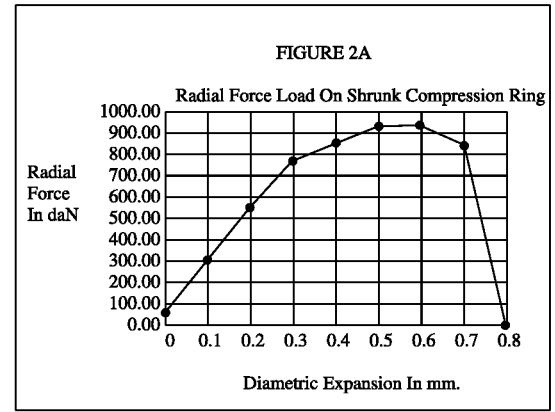

FIGURE 2A

FIGURE 2B

Radial Force Diagram Shrink Ring Size 49.6 - Band 9 × 1.2
Material Galvanized Steel ST 02 Z-275-N-A

| Diameter Increase | Axial Load in Kg | | | | Average Value Radial Force In |
|---|---|---|---|---|---|
| In mm | Ring 1 | Ring 2 | Ring 3 | Ring 4 | daN |
| 0 | 1.00 | 1.00 | 1.00 | 1.00 | 28.05 |
| 0.1 | 8.00 | 6.00 | 7.00 | 8.00 | 203.36 |
| 0.2 | 21.00 | 15.00 | 20.00 | 23.00 | 553.99 |
| 0.3 | 32.00 | 24.00 | 47.00 | 46.00 | 1044.86 |
| 0.4 | 39.00 | 35.00 | 51.00 | 49.00 | 1220.18 |
| 0.5 | 48.00 | 44.00 | 49.00 | 50.00 | 1339.39 |
| 0.6 | 49.00 | 44.00 | 49.00 | 48.00 | 1332.38 |
| 0.7 | 53.00 | 46.00 | 46.00 | 47.00 | 1346.40 |
| 0.8 | 45.00 | 41.00 | 42.00 | 45.00 | 1213.16 |
| 0.9 | 0.00 | 0.00 | 0.00 | 0.00 | 0.00 |

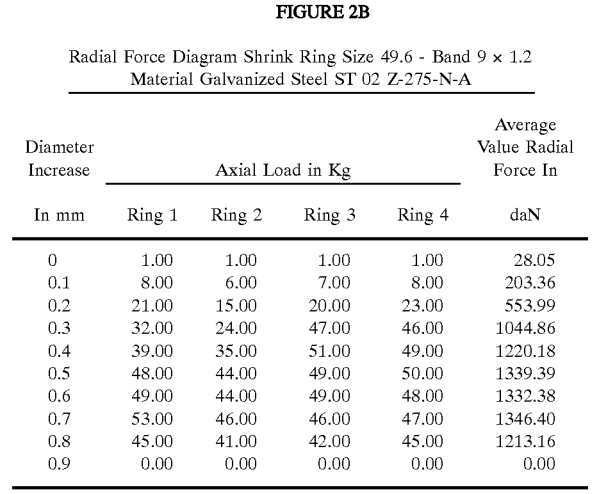

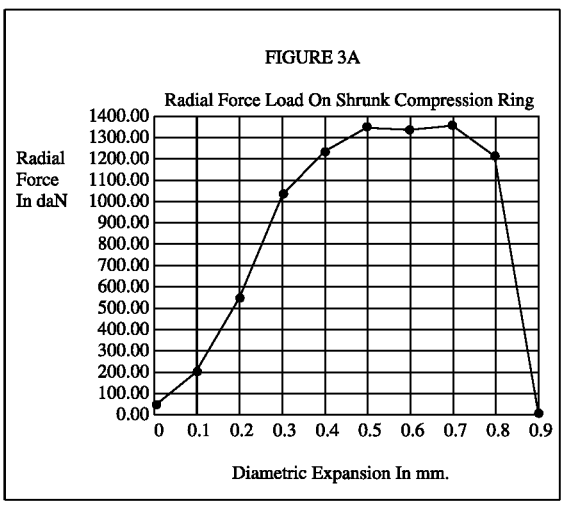

FIGURE 3A

FIGURE 3B

Radial Force Diagram Shrunk Ring Size 57.0 - Band 9 × 2.5
Material peraluman 300-02 Al—Mg3

| Diameter Increase | Axial Load in Kg | | | | Average Value Radial Force In |
|---|---|---|---|---|---|
| In mm | Ring 1 | Ring 2 | Ring 3 | Ring 4 | daN |
| 0 | 1 | 1 | 1 | 1 | 28.05 |
| 0.1 | 27 | 29 | 12 | 19 | 610.09 |
| 0.2 | 50 | 42 | 33 | 38 | 1143.04 |
| 0.3 | 57 | 51 | 43 | 49 | 1402.50 |
| 0.4 | 53 | 57 | 50 | 57 | 1521.71 |
| 0.5 | 53 | 55 | 53 | 60 | 1549.76 |
| 0.6 | 51 | 53 | 43 | 55 | 1416.53 |
| 0.7 | 49 | 49 | 37 | 52 | 1311.34 |
| 0.8 | 0 | 0 | 0 | 0 | 0 |

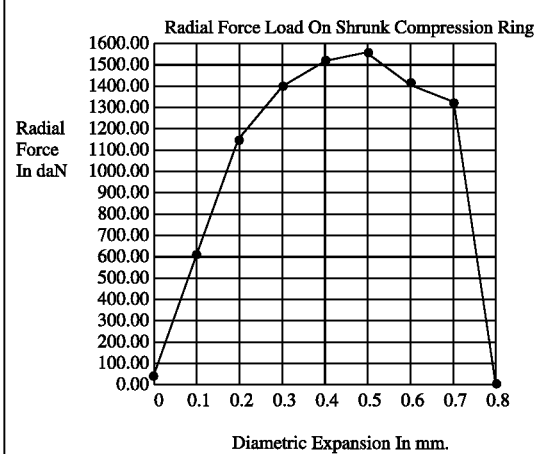

FIGURE 4A

FIGURE 4B

Radial Force Diagram Shrunk Ring Size 70.6 - Band 7 × 1.2
Material Galvanized Steel ST 02 Z-275-N-A

| Diameter Increase | Axial Load in Kg | | | | Average Value Radial Force In |
|---|---|---|---|---|---|
| In mm | Ring 1 | Ring 2 | Ring 3 | Ring 4 | daN |
| 0 | 1.00 | 1.00 | 1.00 | 1.00 | 28.05 |
| 0.1 | 6.00 | 8.00 | 9.00 | 7.00 | 210.38 |
| 0.2 | 25.00 | 28.00 | 28.00 | 28.00 | 764.36 |
| 0.3 | 30.00 | 34.00 | 35.00 | 35.00 | 953.70 |
| 0.4 | 35.00 | 31.00 | 38.00 | 31.00 | 946.69 |
| 0.5 | 32.00 | 30.00 | 36.00 | 35.00 | 932.66 |
| 0.6 | 29.00 | 29.00 | 20.00 | 28.00 | 743.33 |
| 0.7 | 19.00 | 15.00 | 19.00 | 22.00 | 525.94 |
| 0.8 | 0.00 | 0.00 | 0.00 | 0.00 | 0.00 |
| | | | | | 0.00 |

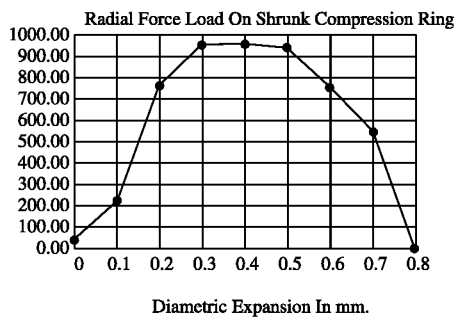

FIGURE 5A

FIGURE 5B

Radial Force Diagram Shrunk Ring Size 70.6 - Band 7 × 1.5
Material Peraluman 300-02 Al—Mg3

| Diameter Increase | Axial Load in Kg | | | | Average Value Radial Force In |
|---|---|---|---|---|---|
| In mm | Ring 1 | Ring 2 | Ring 3 | Ring 4 | daN |
| 0 | 0.50 | 0.50 | 0.50 | 0.50 | 14.03 |
| 0.1 | 5.00 | 3.00 | 3.00 | 4.00 | 105.19 |
| 0.2 | 19.00 | 10.00 | 8.00 | 18.00 | 385.69 |
| 0.3 | 22.00 | 17.00 | 19.00 | 20.00 | 546.98 |
| 0.4 | 19.00 | 20.00 | 21.00 | 22.00 | 575.03 |
| 0.5 | 18.00 | 19.00 | 22.00 | 21.00 | 561.00 |
| 0.6 | 0.00 | 0.00 | 0.00 | 0.00 | 0.00 |

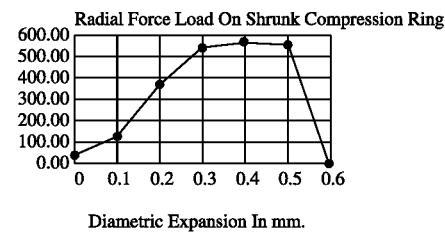

Radial Force Diagram Shrunk Ring Size 76.8 - Band 7 × 1.5
Material Peraluman 300-02 Al—Mg3

| Diameter Increase | Axial Load in Kg | | | | Average Value Radial Force In |
|---|---|---|---|---|---|
| In mm | Ring 1 | Ring 2 | Ring 3 | Ring 4 | daN |
| 0 | 0.50 | 0.50 | 0.50 | 0.50 | 14.03 |
| 0.1 | 6.00 | 1.00 | 10.00 | 6.00 | 231.41 |
| 0.2 | 18.00 | 20.00 | 19.00 | 17.00 | 518.93 |
| 0.3 | 21.00 | 21.00 | 20.00 | 20.00 | 575.03 |
| 0.4 | 21.00 | 20.00 | 20.00 | 19.00 | 561.00 |
| 0.5 | 0.00 | 0.00 | 0.00 | 0.00 | 0.00 |

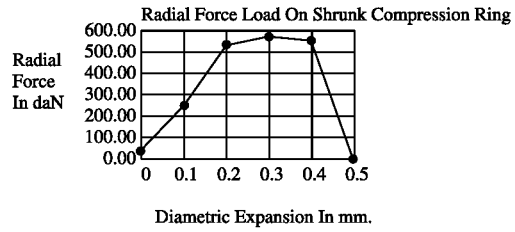

FIGURE 7A

FIGURE 7B

Radial Force Diagram Shrunk Ring Size 85.0 - Band 10 × 1.5
Material Peraluman 300-02 Al—Mg3

| Diameter Increase | Axial Load in Kg | | | | Average Value Radial Force In |
|---|---|---|---|---|---|
| In mm | Ring 1 | Ring 2 | Ring 3 | Ring 4 | daN |
| 0 | 1.00 | 1.00 | 1.00 | 1.00 | 28 |
| 0.1 | 4.00 | 3.00 | 3.00 | 3.00 | 91.16 |
| 0.2 | 13.00 | 7.00 | 13.00 | 7.00 | 280.50 |
| 0.3 | 21.00 | 16.00 | 23.00 | 15.00 | 525.94 |
| 0.4 | 32.00 | 25.00 | 32.00 | 25.00 | 799.43 |
| 0.5 | 33.00 | 33.00 | 34.00 | 31.00 | 918.64 |
| 0.6 | 35.00 | 35.00 | 32.00 | 33.00 | 946.69 |
| 0.7 | 31.00 | 34.00 | 30.00 | 34.00 | 904.61 |
| 0.8 | 28.00 | 29.00 | 27.00 | 31.00 | 806.44 |
| | | | | | 0.00 |

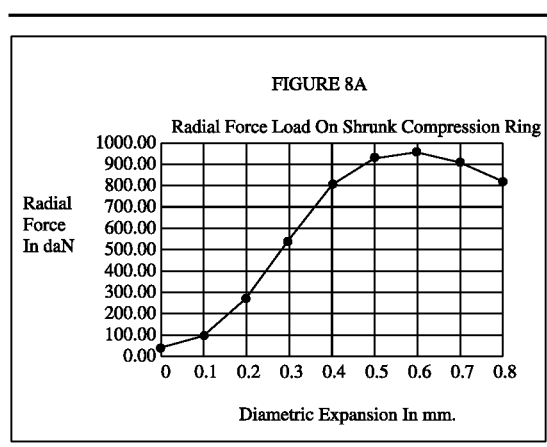

Radial Force Diagram Shrunk - Ring Size 93.0 - Band 10 × 2.5
Material Peraluman 300-02 Al—Mg3

| Diameter Increase | Axial Load in Kg | | | | Average Value Radial Force In |
|---|---|---|---|---|---|
| In mm | Ring 1 | Ring 2 | Ring 3 | Ring 4 | daN |
| 0 | 1.00 | 1.00 | 1.00 | 1.00 | 28.05 |
| 0.1 | 3.00 | 3.00 | 4.00 | 10.00 | 140.25 |
| 0.2 | 16.00 | 16.00 | 27.00 | 27.00 | 603.08 |
| 0.3 | 43.00 | 45.00 | 50.00 | 43.00 | 1269.26 |
| 0.4 | 59.00 | 59.00 | 58.00 | 65.00 | 1619.89 |
| 0.5 | 60.00 | 61.00 | 61.00 | 60.00 | 1697.03 |
| 0.6 | 60.00 | 57.00 | 57.00 | 60.00 | 1640.93 |
| 0.7 | 60.00 | 52.00 | 53.00 | 54.00 | 1535.74 |
| 0.8 | 49.00 | 49.00 | 50.00 | 44.00 | 1346.40 |
| 0.9 | 0.00 | 0.00 | 0.00 | 0.00 | 0.00 |

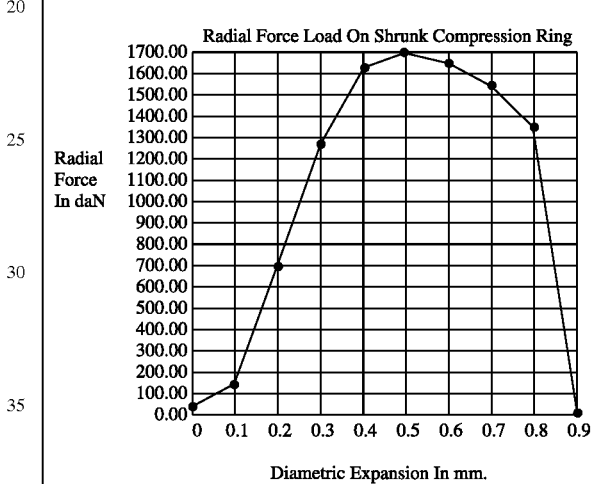

FIGURE 9A

FIGURE 9B

While I have shown and described the details of several embodiments in accordance with this invention, it is understood that the same is not limited thereto but is susceptible of numerous changes and modifications as known to those skilled in the art. For example, the swaging operation may be part of the completely automatic manufacture of such compression rings, as more fully described in my copending provisional application, Ser. No. 60/018,025, filed on May 21, 1996, and entitled "Machine For Automatically Manufacturing Puzzle-Lock Compression Rings" (D/21563), the subject matter of which is hereby incorporated in its entirety into this application. Accordingly, I therefore do not wish to be limited to these details but intend to cover all such changes and modifications as are encompassed by the scope of the appended claims.

I claim:

1. A compression ring with a mechanical connection having complementary male and female parts in respective end portions of the ring, which comprises in the male part a tongue-like extension with an enlarged head portion adapted to engage with its head portion from behind in a recess of complementary shape in the female portion, characterized in that the head portion includes substantially transversely extending abutment surfaces extending at substantially right angles to substantially longitudinally extending abutment surfaces of the tongue-like extension, in that the transversely extending abutment surfaces adjoin lateral abutment surfaces of the head portion extending substantially in the longitudinal direction of the compression ring by way of substantially right angles, and in that the lateral longitudinally extending abutment surfaces of the head portion adjoin into a transversely extending end abutment surface of the head portion by way of curved portions.

2. A compression ring according to claim 1, wherein the curved portions encompass substantially a quarter of a circle.

3. A compression ring according to claim 2, wherein the radius of curvature of the curved portions is small.

4. A compression ring according to claim 3, wherein said respective end portions are provided with additional substantially transversely extending mutually engaging abutment surfaces, characterized in that joints along at least some of the mutually engaging abutment surfaces and end abutment surface are provided with swaged material displacements to limit the likelihood of relative radial movement between the end portions.

5. A compression ring according to claim 4, wherein material displacements are provided along both the radially inner and outer surfaces of the compression ring within the area of the joints.

6. A compression ring according to claim 5, wherein said material displacements of the radially inner and outer surfaces are substantially symmetrically arranged on the radially inner and outer surfaces of a respective joint.

7. A compression ring according to claim 6, wherein said material displacements are realized by notches of small depth formed by swaging.

8. A compression ring according to claim 1, wherein the radius of curvature of the curved portions is small.

9. A compression ring according to claim 1, wherein said respective end portions are provided with additional substantially transversely extending mutually engaging abutment surfaces, characterized in that joints along at least some of the mutually engaging abutment surfaces and the end abutment surface are provided with swaged material displacements to limit the likelihood of relative radial movement between the end portions.

10. A compression ring according to claim 9, wherein material displacements are provided along both the radially inner and outer surfaces of the compression ring within the area of the joints.

11. A compression ring according to claim 10, wherein said material displacements of the radially inner and outer surfaces are substantially symmetrically arranged on the radially inner and outer surfaces of a respective joint.

12. A compression ring according to claim 9, wherein said material displacements are realized by notches of small depth formed by swaging.

13. A method of strengthening a mechanical connection including complementary male and female end parts in a compression ring against unintentional reopening, in which the mechanical connection has in the male and female parts thereof transversely extending, mutually-engaging force-absorbing abutment surfaces, comprising the step of subjecting at least some of the transversely extending abutment surfaces to a swaging action along the internal and external surfaces of the ring within the areas of a joint causing material displacement over joints formed by said abutment surfaces.

14. A method according to claim 13, wherein the swaging action is carried out symmetrically with respect to the inner and external surfaces of a respective joint.

15. A method according to claim 14, comprising the steps of stamping out a flat blank with male and female end parts forming the complementary parts of a mechanical connection having a tongue-like extension with an enlarged head portion in the male part, recesses in said female part complementary to said tongue-like extension and said enlarged head portion, and substantially transversely extending abutment surfaces, with the substantially transversely extending abutment surfaces of the head portion forming a substantially right angle with adjoining substantially longitudinally extending abutment surfaces of the tongue-like extension and with lateral adjoining abutment surfaces of the head portion, while providing a curved transition from said lateral adjoining abutment surfaces to an abutment end surface of the head portion, and carrying out the swaging action at least within the area of the abutment end surface.

16. A method forming from flat band material a compression ring having a mechanical connection in the male and female end parts thereof, comprising the steps of stamping out a flat blank with male and female end parts forming the complementary parts of a mechanical connection having a tongue-like extension with an enlarged head portion in the male part, recesses in said female part complementary to said tongue-like extension and said enlarged head portion, and substantially transversely extending abutment surfaces with the substantially transversely extending abutment surfaces of the head portion forming a substantially right angle, with adjoining substantially longitudinally extending abutment surfaces of the tongue-like extension and with lateral adjoining abutment surfaces of the head portion, while providing a curved transition from said lateral adjoining abutment surfaces to an abutment end surface of the head portion.

17. A compression ring made from a blank of band material which has a mechanical connection in the form of complementary male and female parts in respective end portions of the blank which are mutually engaged to close the ring, said male and female parts having complementary substantially transversely extending force-absorbing abutment surfaces, characterized by swaged material displacement means on the inner and outer surfaces of the ring within the area of at least one of said transversely extending abutment surfaces to lessen the likelihood of unintentional reopening, said swaged material displacement means forming notches of small depth which are each formed by two sides of unequal length and subtending an acute angle.

18. A compression ring according to claim 17, wherein the shorter of the two sides extends substantially radially and the longer one of the two sides extends over a joint formed by a respective pair of abutment surfaces.

19. A compression ring according to claim 18, wherein said acute angle is of the order of 60° and wherein said depth is of the order of 0.35 mm. in the radial direction at the point of maximum depth where the two sides intersect.

20. A compression ring according to claim 19, wherein the swaged means are arranged on the inner and outer surface of the ring substantially symmetrically with respect to the joint formed by a respective pair of abutment surfaces.

21. A compression ring according to claim 20, wherein said male part includes a tongue-like extension with an enlarged head portion adapted to engage in a complementary recess in the female part, the distal end of the head portion, as viewed in the circumferential direction, and the complementary surface in said recess forming substantially transversely extending abutment surfaces provided with swaged means.

22. A compression ring according to claim 18, wherein said two sides intersect with each other with a curved portion having a small radius of curvature, and wherein said two sides pass over into the outer surface of the ring with a curved portion having a small radius of curvature.

23. A compression ring according to claim 22, wherein said radius of curvature is of the order of 0.1 mm.

24. A compression ring according to claim 17, wherein the swaged means are arranged on the inner and outer surface of the ring substantially symmetrically with respect to a joint formed by a respective pair of abutment surfaces.

25. A compression ring according to claim 17, wherein said male part includes a tongue-like extension with an enlarged head portion adapted to engage in a complementary recess in the female part, the distal end of the head portion, as viewed in the circumferential direction, and the complementary surface in said recess forming substantially transversely extending abutment surfaces provided with swaged means.

* * * * *